June 24, 1941.                G. K. TURNER                2,246,870
                 MOTOR VEHICLE SWEEP RAKE ATTACHMENT
                  Filed Jan. 22, 1940      2 Sheets-Sheet 1
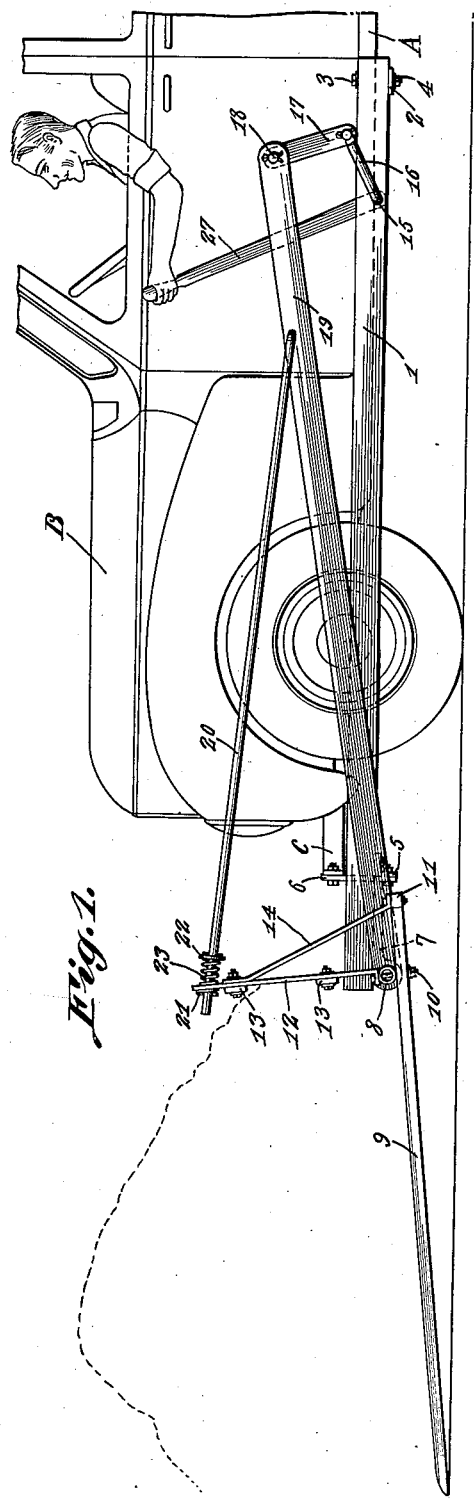
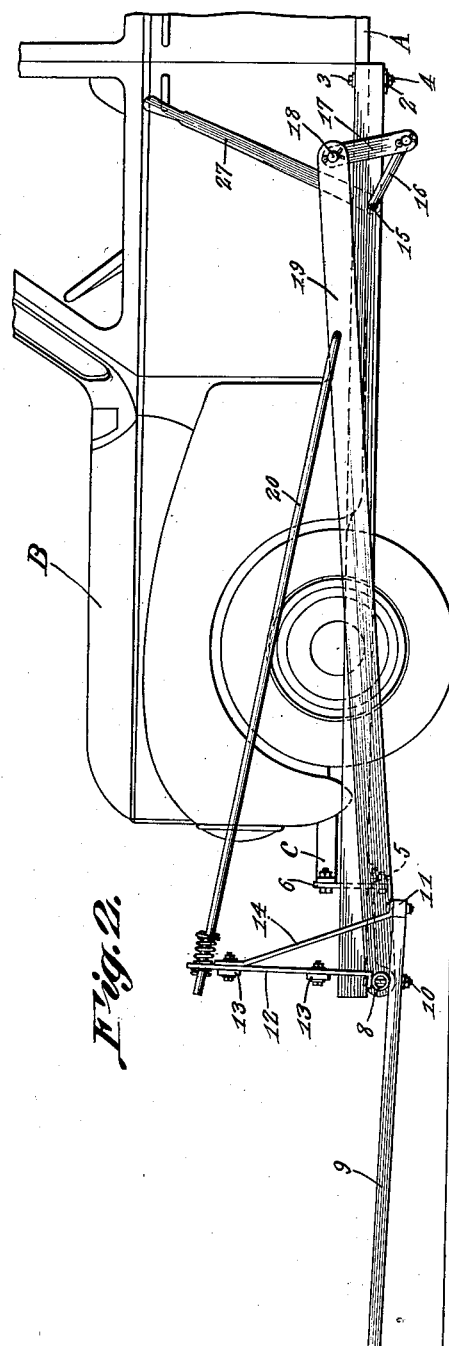
George K. Turner, INVENTOR
BY Victor J. Evans & Co.
ATTORNEYS

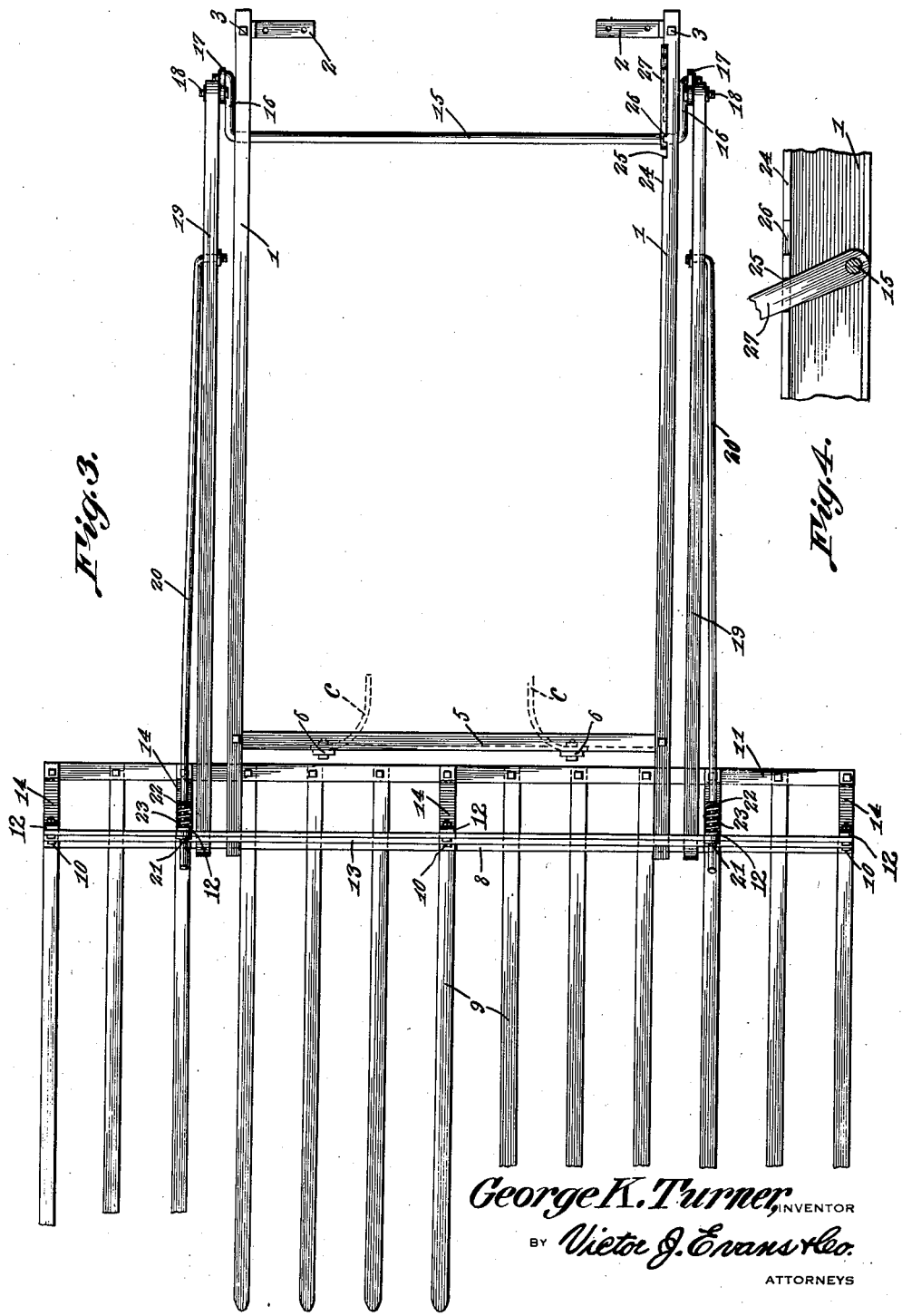

Patented June 24, 1941

2,246,870

UNITED STATES PATENT OFFICE 2,246,870

MOTOR VEHICLE SWEEP RAKE ATTACHMENT

George K. Turner, Eagle Nest, N. Mex.

Application January 22, 1940, Serial No. 315,115

1 Claim. (Cl. 56—27)

This invention relates to sweep rake attachments for motor vehicles, and its general object is to provide a sweep rake that is primarily designed for use with high speed vehicles such as trucks and pleasure automobiles, in that my rake is capable of being operated with minimum effort, as such operation is brought about merely by a continuous forward movement of a hand lever, which lowers and automatically locks the rake teeth in hay gathering position, while a continuous rearward movement of the lever will raise and automatically lock the teeth in normal or hay carrying position, thus it will be seen that by the use of my rake with a high speed vehicle, a maximum quantity of hay can be handled in minimum time.

A further object is to provide a sweep rake that includes a lift which provides ample leverage to facilitate the raising of the rake, and the lifting and supporting action is partially applied to the top of the rake head and the tooth bar or sill of the head, thereby relieving strain on the head and consequently distortion and damage thereto, as well as making it possible for the rake to lift and support heavier loads than rakes now in general use.

Another object is to provide a sweep rake that can be attached to a vehicle with minimum change to the structure of the latter and in an easy and expeditious manner, yet casual displacement or removal is practically impossible.

A still further object is to provide a sweep rake, that is simple in construction, inexpensive to manufacture and extremely efficient in operation, use and service.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a side elevation illustrating my rake attached to a pleasure automobile of the sedan type, and with the rake in lowered or hay gathering position.

Figure 2 is a similar view with the rake in raised or hay carrying position.

Figure 3 is a top plan view of the rake per se.

Figure 4 is a fragmentary detail view illustrating the hand lever and the latching means therefor, for holding the rake in either of its positions.

Referring to the drawings in detail, it will be noted that I have illustrated my rake as being attached to a pleasure automobile of the sedan type, and while it is primarily designed for use with a high speed vehicle of that type, including trucks, it will of course be understood that it can be used with slow speed vehicles, such as tractors and the like.

In any event, my rake includes a pair of base or supporting beams 1 that are straight throughout the length thereof and which have their rear ends fixed to the vehicle by a pair of attaching plates 2, there being one plate for each beam and secured adjacent to the rear end thereof by bolt and nut connections 3. The plates 2 are preferably secured to the underside of the running board A of the vehicle B, by bolt and nut connections 4, as indicated in Figures 1 and 2, but they can be secured to the vehicle frame or any other appropriate place on the vehicle, as will be apparent.

Secured to and bridging the beams 1 adjacent to the forward ends thereof, is an angle bar 5 that has secured to and rising therefrom adjacent to its ends, attaching plates 6 which have their upper ends fixed to the bumper brackets C, with the result it will be seen that my rake can be attached to a vehicle of the type shown, merely by removing the bumper bar and securing the beams 1 upon opposite sides of the vehicle through the instrumentality of the attaching plates 2 and 6.

Secured to the underside of the beams 1 at the forward ends thereof are bearing members 7 having rockably mounted therein, a transverse shaft 8 which have the teeth 9 secured thereto and preferably to the underface thereof by bolt and nut connections 10, the teeth being provided with the usual bar or sill 11, which have the teeth secured thereto and extending forwardly therefrom, as best shown in Figure 3.

The rake head not only includes the bar 11, but also uprights 12 that are secured to and rise from the shaft 8, there being end uprights, intermediate uprights and a center upright. The uprights are secured to the shaft by the bolts of the bolt and nut connections 10, as clearly shown in Figures 1 and 2, and secured to and bridging the uprights are cross members 13 which cooperate therewith to provide a guard or barrier for the hay, as will be apparent upon inspection of Figure 1. The guard is reinforced by brace members 14 secured to and extending at a downward inclination and rearwardly from the upper ends of the uprights and having the lower ends secured to the bar 11.

The gist of my invention lies in the raising and lowering means for the rake head and said means includes a crank shaft 15 mounted for rocking movement in the supporting beams 1 adjacent to the inner ends thereof, with the crank arms 16 of the shaft 15 extending outwardly of the beams and terminating in outwardly directed bearing ends having one of the ends of links 17 pivotally mounted thereon, while pivotally connected to the opposite ends of the links 17 by pivot pins 18 are the rear ends of lifting levers 19, the forward ends of the lifting levers being fulcrumed or pivotally mounted on the shaft 8 and the levers 19 bear against the bar 11 to facilitate raising the teeth to hay carrying position as shown in Figure 2.

Pivotally connected to the lifting levers 19 rearwardly of the center thereof are one of the ends of push rods 20, while their opposite ends are slidably mounted through the upper ends of the intermediate uprights 12, and connected thereto by cotter pins 21 in the form as shown, to limit rearward movement of the rods 20. Sleeved on the rods 20 and bearing against the rear faces of the uprights, as well as against abutment washers 22 mounted on the rods, are coil springs 23 which urge and hold the teeth in their hay gathering position of Figure 1.

The beams 1 may be identical, but in any event the left hand beam or in other words the beam which is secured to the vehicle on the driver's side thereof, is provided with an inwardly directed flange 24 extending along the upper longitudinal edge of the beam and the flange is provided with a pair of notches 25 and 26 providing keepers or latching means for a hand lever 27 that is fixed to the crank shaft 15 for disposal exteriorly of the vehicle in convenient reach of the driver, as clearly shown in Figure 1. The hand lever is made from resilient metal and is fixed to the crank shaft at a position thereon, so that it will spring into the notches when moved in registration therewith, for locking the rake in either of its raised or lowered positions.

From the above description and disclosure in the drawings, it will be obvious that when it is desired to gather hay upon the rake teeth, as shown in Figure 1, the hand lever 27 is moved forwardly for disposal within the notch 25 and such movement will result in raising the lifting levers from their connection with the shaft 8, and moving the push rods 20 forwardly, for lowering and holding the rake in its lowered position. When it is desired to lift the rake for carrying the hay, or in other words to its normal position of Figure 2, the hand lever 27 is moved rearwardly for disposal into the notch 26, and such movement will result in swinging the levers 19 in bearing relation against the bar 11, as well as cause the rods to pull upon the upper ends of the uprights 12 for moving the rake to its raised position of Figure 2, therefore it will be seen that the lifting action is not only applied against the bar or sill 11 of the rake teeth, but also to the top of the rake head or guard, and such materially facilitates the lifting action, as well as prevents strain, distortion and damage to the rake. It will be further obvious that when the rake is in its lowered position of Figure 1, that in the event the teeth should contact an obstruction, the springs 23 will give and thereby prevent damage to the parts.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is: :

A sweep rake attachment for a motor vehicle, comprising a pair of supporting beams to be fixed to the vehicle upon opposite sides thereof and for disposal forwardly therefrom, raking means including a sill, a rock shaft for the raking means and the teeth of the latter being fixed to the shaft forwardly of the sill, said shaft being mounted at the forward ends of the beams for rocking movement of the raking means, guard means rising from the rear end of the raking means, levers having their forward ends mounted on the shaft for pivotal movement and bearing against the upper surface of the sill, rods having their forward ends slidably mounted through the top of the guard means and resiliently connected thereto, said rods being pivotally connected to the levers adjacent to the rear ends thereof for cooperation therewith for raising and lowering the raking means, a crank shaft including arms at the ends thereof and bridging and mounted for rocking movement in and through the beams adjacent their rear ends to underlie the vehicle and for disposal of the arms laterally of the latter, links connecting the arms to the rear ends of the levers, a handle fixed to the crank shaft for operating the same, and one of said beams having a pair of notches therein for receiving the handle for holding the raking means in either raised or lowered position.

GEORGE K. TURNER.